United States Patent [19]

Takano et al.

[11] Patent Number: 4,497,654
[45] Date of Patent: Feb. 5, 1985

[54] FERROMAGNETIC METALLIC POWDERS USEFUL FOR MAGNETIC RECORDING AND PROCESSES FOR PRODUCING SAID METALLIC POWDERS

[75] Inventors: Katsuhiro Takano; Yoshishige Koma; Masaru Hagiwara; Shintaro Suzuki, all of Gunma, Japan

[73] Assignee: Kanto Denka Kogyo Co., Ltd., Tokyo, Japan

[21] Appl. No.: 550,114

[22] Filed: Nov. 9, 1983

[30] Foreign Application Priority Data

Nov. 29, 1982 [JP] Japan .................................. 57-208937

[51] Int. Cl.$^3$ ................................................ B22F 9/00
[52] U.S. Cl. .................................. 75/0.5 AA; 75/251; 148/105
[58] Field of Search ........................... 75/0.5 AA, 251; 148/105

[56] References Cited

U.S. PATENT DOCUMENTS

| | | | |
|---|---|---|---|
| 3,702,270 | 11/1972 | Kawasaki et al. | 148/105 |
| 4,050,962 | 9/1977 | Koester et al. | 75/0.5 BA |
| 4,305,753 | 12/1981 | French | 148/105 |
| 4,306,921 | 12/1981 | Suzuki et al. | 148/105 |
| 4,342,589 | 8/1982 | Ohshima et al. | 148/105 |
| 4,404,024 | 9/1983 | Suzuki et al. | 75/0.5 AA |

*Primary Examiner*—W. Stallard
*Attorney, Agent, or Firm*—Browdy and Neimark

[57] ABSTRACT

Ferromagnetic Fe-Ni alloy powders having the combination of a coercive force of 550–900 Oe (oersted) and a saturation flux density of 90–170 emu/g are provided by applying a nickel compound in a liquid to a particulate, oxygen-containing iron compound having an average particle length of 0.5–5 $\mu$m and an average particle width of 0.02–0.5 $\mu$m, and then drying and reducing the treated material to produce a metallic powder. The ferromagnetic powders are suitable for production of magnetic recording media because of the balanced magnetic properties.

22 Claims, No Drawings 4,497,654

FERROMAGNETIC METALLIC POWDERS USEFUL FOR MAGNETIC RECORDING AND PROCESSES FOR PRODUCING SAID METALLIC POWDERS

BACKGROUND OF THE INVENTION

This invention relates to ferromagnetic metallic powders and the production thereof. In particular, the present invention relates to magnetic recording ferromagnetic metal powders which show a combination of coercive force and saturation flux density properties suitable for use in high density magnetic recording and to processes for producing said ferromagnetic metal powders.

BACKGROUND OF THE INVENTION

Magnetic recording media comprising ferromagnetic materials have been employed in a variety of applications and their characteristic requisites vary from application to application. Examples of ferromagnetic powder materials which have been used for the production of magnetic recording media include $\gamma\text{-Fe}_2O_3$, Co-containing $\gamma\text{-Fe}_2O_3$, $Fe_3O_4$, Co-containing $Fe_3O_4$, $Fe_3O_4$-$\gamma\text{-Fe}_2O_3$ and $CrO_2$. These conventional ferromagnetic powder materials, however, do not necessarily exhibit satisfactory magnetic properties, such as coercive force and saturation flux density. Therefore, recently, strong attention has been focussed on ferromagnetic metallic powders because of their high levels of coercive force and saturation flux density.

However, the existing ferromagnetic metallic powders exhibit such a high level of coercive force that recording media prepared therefrom can not be used in the conventional recording and reproducing instruments such as audio, video and digital recording and reproducing systems. Thus, the known ferromagnetic metallic powder materials are useful only for production of recording media (metallic media) which are adapted to be used in the modern recording and reproducing instruments designed to be operable with such metallic media.

In order to permit ferromagnetic metallic powder materials to be used in a broader range of applications, therefore, it is desirable to develop a new ferromagnetic metallic powder which exhibits a moderately decreased level of coercive force as well as a level of saturation flux density as high as that achieved by the known metallic powders.

As far as we have investigated, there have been no metallic powders having such a desirable combination of magnetic properties as above mentioned.

We have studied and worked intensively to develop a ferromagnetic metallic powder having the combination of a moderate level of coercive force and a high level of saturation flux density.

A number of processes have been proposed for the production of ferromagnetic metallic powders. Typical examples of the known processes are listed below:

(1) thermal decomposition of a metal salt of organic acid (typically an oxalate) followed by reduction with a reducing gas, (2) reduction of an oxygen-containing iron compound (e.g. iron oxyhydroxides, iron oxyhydroxides containing one or more other metals, iron oxides, or oxides of a ferrite composition) with a reducing gas, (3) evaporation of a ferromagnetic metal alloy in an inert gas, (4) decomposition of a carbonyl compound of ferromagnetic metal, (5) electrolytic deposition of a ferromagnetic metal powder by the mercury electrolysis technique followed by separation of the entrained mercury from the product, (6) wet-reduction of a solution of a ferromagnetic metal salt with a reducer such as sodium boron hydride or sodium hypochlorite, (7) electric discharge-explosion of a solid ferromagnetic metal using a very high impact current.

Of these known processes, the process (2) comprising the step of reducing an oxygen-containing iron compound with a reducing gas in the dry state has been found to be most preferred in view of such advantages as easy control of the magnetic properties of products, and the commercial feasibility and comparatively low operation costs thereof.

Thus, the process of the present invention comprises an improvement of the above known process (2).

DISCLOSURE OF THE INVENTION

According to the present invention, there is provided a process for producing ferromagnetic metallic powders which comprises the steps of applying an Ni compound in a liquid form to a particulate oxygen-containing iron material having an average particle length of about 0.5–5 $\mu$m and an average particle width of about 0.02–0.5 $\mu$m selected from iron oxyhydroxides and iron oxides and which may contain one or more metals other than iron, such as Mn, Ni, Ti, Bi, Mo and Ag preferably in a proportion of about 0.5–5% by weight and then drying and reducing the thus Ni-applied material to give a ferromagnetic metallic powder containing about 10–50% by weight of Ni. The application of the Ni compound may be effected in any conventional manner, for example, by adsorption, absorption, deposition or precipitation.

It has been found that the product powders according to the present process exhibit a level of coercive force which is lower than those of the conventional metallic powders but is suitable for use in a broader range of applications. It has also been found that the powder products according to the present process have a saturation flux density comparable with those of the conventional metallic powders. Therefore, apart from the moderate level of coercive force, the ferromagnetic metallic powders produced according to the present process have substantially the same magnetic properties as those of the conventional metallic powders.

It has been found that the present ferromagnetic metallic powders may be used to prepare new types of magnetic recording media which are satisfactorily employed not only in the modern recording and reproducing instruments such as audio, video and digital recording and reproducing systems, designed to be operable with the recording media prepared from the conventional metallic powders, but also in those recording and reproducing instruments which are not so designed.

According to the present invention there is also provided a ferromagnetic metallic powder having a coercive force in the range of about 550–900 Oe (oersted) and a saturation flux density in the range of about 90–170 emu/g. The powder shows an excellent dispersibility in vehicles to form a stable coating composition for use in the production of recording media.

During the present process, the particles of the starting material are effectively protected from damaging (e.g. altering of the original shape and dimensions) and sintering, because of the particle dimensions (i.e. particle length and width) being specified and the application of the Ni compound to the starting material and reduction of the Ni-loaded material with a reducing gas, e.g. hydrogen, to produce an iron-based alloy of an Ni content in the specified range. Thus a desired combination of magnetic properties such as coercive force, saturation flux density, residual flux density and squareness ratio, an excellent dispersibility in liquids and a significantly retarded spontaneous combustion property are rendered to the product metallic powder.

It has been advantageously found that both the coercive force property and the saturation flux density property of the product powder may be controlled by selecting the particle dimensions of the starting material and the level of Ni applied to the material. With the controlling means, it is possible to obtain products of a coercive force within the range of from about 400 Oe to about 1000 Oe. However, it has been found that the product having a coercive force of as low as around 400 Oe (due to large particle dimensions) tends to give rise to a recording medium of a low S/N property. The product having a coercive force of as high as around 1000 Oe is also disadvantageous in that the product tends to provide a recording medium having an undesirable erasing property such that magnetic signs recorded thereon are incompletely or not erased by instruments not operable with the conventional metallic media.

On the other hand, with the controlling means, product metallic powder may be rendered having a saturation flux density in the range of about 60–200 emu/g. However, the powder having a saturation flux density of less than 90 emu/g is less desirable for the purpose of the present invention, because it tends to provide magnetic recording media of a rather lower output than those achieved by media prepared from the conventional metallic powders. If it is required to prepare a ferromagnetic powder having a saturation flux density of greater than 171 emu/g, then the reducing step should be conducted at a fairly elevated temperature for an extended period which results in significant damage to the original particle shape of the starting material and consequently in a seriously decreased squareness ratio.

From discussion of the above factors, it has been concluded that in order to provide recording media useful not only in the modern recording and reproducing instruments designed to be operable with the conventional metallic media but also in those instruments which are not so designed, the ferromagnetic metallic powder should have a coercive force in the range of about 550–900 Oe, preferably 600–800 Oe and a saturation flux density in the range of about 90–170 emu/g, preferably 120–160 emu/g.

The starting materials which are employed in the present invention should have specified ranges of the average particle length and width as randomly inspected by electron microscopy. Where the mean particle length is less than about 0.5 $\mu$m and the mean particle width is less than about 0.02 $\mu$m, the product metallic powder will have a coercive force of greater than about 900 Oe. If the mean particle length is greater than about 5 $\mu$m and the mean particle width is greater than 0.5 m, then the product powder will have a coercive force of less than about 550 Oe. Hence, the starting material should have preferably an average particle length of about 0.5–5 $\mu$m, more preferably about 1–3 $\mu$m and an average particle width preferably of about 0.02–0.5 $\mu$m, more preferably 0.05–0.3 $\mu$m.

In this context, the Ni content of the product powder is that as measured by atomic absorption spectroscopy. It has been found that when the product metallic powder contains less than about 10% by weight of Ni, the powder has a coercive force of greater than about 900 Oe. If the Ni content of the powder is greater than about 50% by weight, the powder has a coercive force of less than about 550 Oe and a saturation flux density of less than about 90 emu/g. Therefore, the ferromagnetic metallic powder should have an Ni content in the range of about 10–50%, preferably about 20–40% by weight.

Particular examples of the starting materials useful in the present invention include iron oxyhydroxides such as $\alpha$-, $\beta$- and $\gamma$-FeOOH; iron oxides such as $\alpha$- and $\gamma$-$Fe_2O_3$, $Fe_3O_4$ and $\gamma$-$Fe_2O_3 \cdot Fe_3O_4$ (a Berthollide compound); and the above iron oxyhydroxides and oxides doped with, for example about 0.5–5% by weight of at least one metal such as Mn, Ni, Ti, Bi, Mo and Ag.

The Ni compounds which may be used in the invention are water soluble or colloid-forming compounds. Particular examples include water soluble salts such as $NiCl_2$, $Ni(NO_3)_2$ and $NiSO_4$; and hydroxides or partial hydroxides or colloid-forming materials, such as Ni-$(OH)_xCl_{2-x}$ and $(OH)_x(NO_3)_{2-x}$ (where x is from 0 to 2). The nickel compounds may be used singly or in a mixture.

When the above-exemplified water soluble compounds are employed, the Ni may be applied to the iron oxyhydroxide or oxide starting material merely by bringing a solution of the Ni compound into contact with the starting material for a sufficient time with stirring. However, for most efficient operation, it is preferable for an appropriate neutralizer agent to be added to the mixture to form an Ni-containing precipitate to be deposited on the starting material. For example, where the solution is alkaline after addition of the starting material thereto, an acid such as hydrochloric, sulfuric, phosphoric or nitric acid is added to the mixture in an amount required for partial or complete neutralization, while if the solution is acidic, an alkali such as sodium hydroxide, potassium hydroxide or ammonia is added. By the neutralization, nickel hydroxide or oxide is formed as precipitate and applied to the surface of the starting material. In order to homogenously suspend the particles of the starting material in the mixture during the Ni-applying stage, a surfactant such as sodium oleate or alginate may be advantageously added to the stirred mixture.

Then, the thus Ni-applied material is dried (usually after washing) and reduced in a vessel under a reducing atmosphere at a temperature not exceeding 600° C., preferably at a temperature of less than 500° C. Though the lower limit of the reducing temperature is not critical, practically the reduction should be effected at a temperature of at least 250° C., since an unacceptably extended reducing time is required at lower temperatures.

On completion of the reduction, the reducing vessel and the contents thereof are cooled. Preferably, a stream of a gaseous mixture containing, for example, 1% air and 99% nitrogen is passed through the vessel, while increasing stepwise the air content in the gaseous coolant, finally up to around 100%, in a total period of about 4–5 hours. Then, the product metallic powder is withdrawn from the vessel. The powder may be used for production of various recording media such as magnetic recording tapes and the like.

The present invention will be illustrated in more detail with reference to the specific Examples, but it is not intended that the scope of the invention be restricted thereto.

In Japanese Patent Public Disclosure (KOKAI) No. Sho 52-134828, we have disclosed that an aluminium or silicon compound may be applied to a starting material comprising an iron oxyhydroxide or oxide and then the treated material be reduced to provide a ferromagnetic mettalic powder. We have found that this Al or Si treatment may be effected in conjunction with the present process in parallel.

EXAMPLE 1

An acicular $\alpha$-FeOOH (80 grams) having an average particle length of 0.8 $\mu$m and an average particle width of 0.03 $\mu$m was dispersed in 6 liters of water using a stirrer. Into the dispersion, 750 c.c. of a solution containing 1 mole of nickel chloride per liter was added with stirring.

Then, 750 c.c. of a 2N—NaOH solution was added dropwise to the mixture which was stirred for an additional 30 minutes after completion of the addition of alkali. Then the mixture was filtered to give a wet, Ni-treated $\alpha$-FeOOH cake. The cake was washed with water thoroughly and then dried overnight at about 150° C. A sample (about 10 grams) of the dried cake was reduced in a stream of hydrogen at a rate of 3 liters/minute and at 350° C. for a period of about 7 hours to give a ferromagnetic powder containing 45% by weight of Ni. The product powder exhibited the following magnetic properties as measured in a magnetic field of 10 KOe.

Hc (coercive force) = 850 Oe
$\sigma$r (residual flux density) = 48.4 emu/g
$\sigma$s (saturation flux density) = 103 emu/g
$\sigma$r/$\sigma$s (squareness ratio) = 0.47.

EXAMPLE 2

An acicular $\alpha$-FeOOH (80 grams) having an average particle length of 1.8 $\mu$m and an average particle width of 0.10 $\mu$m was dispersed in 6 liters of water using a stirrer. To the mixture, 610 c.c. of a 1M/l nickel chloride solution was added with stirring. Then, 610 c.c. of a 2N—NaOH solution was added to the mixture which was stirred for an additional 30 minutes. Then the mixture was filtered to give a wet treated $\alpha$-FeOOH cake which was washed with water. The cake was dried overnight at about 150° C. A sample (about 10 grams) of the dried cake was reduced in a stream of hydrogen at a rate of 3 liters/minute and at 350° C. for a period of about 7 hours to give a ferromagnetic powder containing 40% by weight of Ni. The product powder exhibited the following magnetic properties as measured at 10 KOe.

Hc = 780 Oe
$\sigma$r = 49.5 emu/g
$\sigma$s = 110 emu/g
$\sigma$r/$\sigma$s = 0.45.

EXAMPLE 3

An Ni-doped acicular $\alpha$-FeOOH (Ni/Fe = 1wt%) (80 grams) having an average particle length of 3.0 $\mu$m and an average particle width of 0.10 $\mu$m was dispersed in 6 liters of water using a stirrer. To the stirred mixture, 390 c.c. of a 1M/l nickel chloride solution was added. Then, 390 c.c. of a 2N—NaOH solution was added to the mixture which was stirred for an additional 30 minutes and filtered to give a wet treated $\alpha$-FeOOH cake. The cake was then washed with water and dried overnight at about 150° C. A sample (10 grams) of the dried cake was reduced in a stream of hydrogen at a rate of 3 liters/minute and at 350° C. for about 7 hours to give a ferromagnetic powder containing 30% by weight of Ni.

The product powder exhibited the following magnetic properties as measured at 10 KOe.
Hc = 750 Oe
$\sigma$r = 57.5 emu/g
$\sigma$s = 125 emu/g
$\sigma$r/$\sigma$s = 0.46.

EXAMPLE 4

An acicular $\alpha$-FeOOH (80 grams) having an average particle length of 4.2 $\mu$m and an average particle width of 0.38 $\mu$m was dispersed in 6 liters of water using a stirrer. To the stirred dispersion, 230 c.c. of a 1M/l nickel chloride solution was added. Then, 230 c.c. of a 2N—NaOH solution was added to the mixture which was stirred for an additional 30 minutes and then filtered to give a wet treated $\gamma$-FeOOH cake. The cake was washed with water and then dried overnight at about 150° C.

A sample (10 grams) of the dried cake was reduced in a stream of hydrogen at a rate of 3 liters/minute and at 350° C. for a period of about 7 hours to give a ferromagnetic powder having an Ni content of 20% by weight.

The product powder showed the following magnetic properties as measured at 10 KOe.
Hc = 680 Oe
$\sigma$r = 61.6 emu/g
$\sigma$s = 140 emu/g
$\sigma$r/$\sigma$s = 0.44.

EXAMPLE 5

An acicular $\alpha$-Fe$_2$O$_3$ (80 grams) having an average particle length of 3.8 m and an average particle width of 0.30 $\mu$m was dispersed in 6 liters of water using a stirrer. To the stirred dispersion, 180 c.c. of a 1M/l nickel chloride solution was added. Then, 180 c.c. of a 2N—NaOH solution was added to the mixture which was stirred for anadditional 30 minutes and then filtered to give a wet treated $\alpha$-Fe$_2$O$_3$ cake. The cake was washed with water and then dried overnight at about 150° C. A sample (10 grams) of the dried cake was reduced in a stream of hydrogen at a rate of 3 liters/minute and at 350° C. for about 7 hours to give a ferromagnetic powder of an Ni content of 15% by weight.

The product powder showed the following magnetic properties at 10 KOe.
Hc = 580 Oe
$\sigma$r = 64.5 emu/g
$\sigma$s = 150 emu/g
$\sigma$r/$\sigma$s = 0.45.

EXAMPLE 6

An acicular $\alpha$-FeOOH (80 grams) having an average particle length of 1.8 $\mu$m and an average particle width of 0.10 $\mu$m was dispersed in 6 liters of water using a stirrer. To the stirred dispersion 230 c.c. of a 1M/l nickel sulfate solution was added. Then, 230 c.c. of a 2N—NaOH solution was added to the mixture was then stirred for an additional 30 minutes and filtered to give a wet treated $\alpha$-FeOOH cake. The cake was washed with water and dried overnight at about 150° C. A sample (10 grams) of the dried cake was reduced in a stream of hydrogen at a rate of 3 liters/minute and at 350° C. for a period of about 7 hours to give a ferromagnetic powder of an Ni content of 20% by weight.

The product powder showed the following magnetic properties as measured in a magnetic field of 10 KOe.
Hc=870 Oe
$\sigma r$=64.8 emu/g
$\sigma s$=135 emu/g
$\sigma r/\sigma s$=0.48.

EXAMPLE 7

An Mn-doped acicular α-FeOOH (80 grams; Mn/Fe=2.5 wt%) having an average particle length of 3.0 μm and an average particle width of 0.10 μm was dispersed in 6 liters of water using a stirrer. To the stirred dispersion, 230 c.c. of a 1M/l nickel chloride solution was added. Then 230 c.c. of a 2N—NaOH solution was added dropwise to the mixture with stirring. The mixture was stirred for an additional 30 minutes after completion of the alkali addition and then filtered to give an Ni-applied α-FeOOH cake. The cake was washed with water and dried overnight at about 150° C. A sample (10 grams) of the dried cake was reduced in a stream of hydrogen at a rate of 3 liters/minute and at 350° C. for a period of about 7 hours to give a ferromagnetic powder of an Ni content of 20% by weight.

The product powder showed the following magnetic properties as measured at 10 KOe.
Hc=825 Oe
$\sigma r$=63.5 emu/g
$\sigma s$=138 emu/g
$\sigma r/\sigma s$=0.46.

COMPARATIVE EXAMPLE 1

An acicular α-FeOOH (80 grams) having an average particle length of 2.0 μm and an average particle width of 0.05 μm was dispersed in 6 liters of water using a stirrer. To the stirred solution, 50 c.c. of a 1M/l nickel chloride solution was added.

Then 50 c.c. of a 2N—NaOH solution was added dropwise to the mixture which was then stirred for an additonal 30 minutes after completion of the alkali addition. The mixture was filtered to give a wet treated α-FeOOH cake which was washed and dried overnight at about 150° C. A sample (10 grams) of the dried cake was reduced in a stream of hydrogen at a rate of 3 liters/minute and at 350° C. for a period of about 7 hours to give a ferromagnetic powder of an Ni content of 5% by weight.

The product powder showed the following magnetic properties as measured at 10 KOe.
Hc=1000 Oe
$\sigma r$=70.5 emu/g
$\sigma s$=150 emu/g
$\sigma r/\sigma s$=0.47.

COMPARATIVE EXAMPLE 2

An acicular γ-FeOOH (80 grams) having an average particle length of 6.0 μm and an average particle width of 0.80 μm was dispersed in 6 liters of water using a stirrer. To the stirred dispersion, 1,400 c.c. of a 1M/l nickel chloride solution was added. Then, 1,400 c.c. of a 2N—NaOH solution added to the dispersion with stirring. The mixture was stirred for an additional 30 minutes after completion of the alkali addition. Then the mixture was filtered to give a treated γ-FeOOH cake which was then washed with water and dried overnight at about 150° C.

A sample (10 grams) of the dried cake was reduced in a stream of hydrogen at a rate of 3 liters/minute and at 350° C. for about 7 hours to give a ferromagnetic powder of an Ni content of 60% by weight.

The product powder showed the following magnetic properties as measured at 10 KOe.
Hc=400 Oe
$\sigma r$=32.3 emu/g
$\sigma s$=85 emu/g
$\sigma r/\sigma s$=0.38.

COMPARATIVE EXAMPLE 3

An acicular α-FeOOH (80 grams) having an average particular length of 1.8 μm and an average particle width of 0.1 μm was dispersed in 6 liters of water using a stirrer. To the stirred dispersion, 1,400 c.c. of a 1M/l nickel chloride solution was added. Then, 1,400 c.c. of a 2N—NaOH solution was added to the stirred mixture which was stirred for an additional 30 minutes after completion of the alkali addition. The mixture was filtered to give an Ni-treated α-FeOOH cake. The cake was washed with water and dried overnight at about 150° C. A sample (10 grams) of the dried cake was reduced in a stream of hydrogen at a rate of 3 liters/minute and at 350° C. for about 7 hours to give a ferromagnetic powder for an Ni content of 60% by weight.

The product powder showed the following magnetic properties as measured at 10 KOe.
Hc=480 Oe
$\sigma r$=32.8 emu/g
$\sigma s$=82 emu/g
$\sigma r/\sigma s$=0.40.

COMPARATIVE EXAMPLE 4

An acicular α-FeOOH (80 grams) having an average particle length of 0.4 μm and an average particle width of 0.01 μm was dispersed in 6 liters of water using a stirrer. To the stirred dispersion, 230 c.c. of a 1M/l nickel sulfate was added. Then, 230 c.c. of a 2N—NaOH solution added to the stirred mixture. After completion of the alkali addition, the mixture was stirred for an additional 30 minutes and then filtered to give a treated α-FeOOH cake. The wet cake was washed with water and then dried overnight at about 150° C.

A sample (10 grams) of the dried cake was reduced in a stream of hydrogen at a rate of 3 liters/minute and at 350° C. for about 7 hours to give a ferromagnetic powder of an Ni content of 20% by weight.

The product powder showed the following magnetic properties as measured at 10 KOe.
Hc=1,150 Oe
$\sigma r$=68.6 emu/g
$\sigma s$=140 emu/g
$\sigma r/\sigma s$=0.49.

COMPARATIVE EXAMPLE 5

An acicular α-FeOOH (80 grams) was dispersed in 6 liters of water using a stirrer. To the stirred dispersion, 390 c.c. of a 1M/l nickel chloride solution was added. Then, 390 c.c. of a 2N—NaOH solution added dropwise to the stirred mixture. After completion of the alkali addition, the mixture was stirred for an additional 30 minutes and then filtered to give a wet cake of the treated α-FeOOH. The cake was washed thoroughly with water and dried overnight at about 150° C. A sample (10 grams) of the dried cake was then reduced in a stream of hydrogen at a rate of 3 liters/minute and at 350° C. for about 7 hours to give a ferromagnetic powder of an Ni content of 50% by weight.

The product powder had the following magnetic properties as measured at 10 KOe.
Hc = 510 Oe
σr = 56.3 emu/g
σs = 128 emu/g
σr/σs = 0.44.

COMPARATIVE EXAMPLE 6

An acicular α-FeOOH (10 grams) having an average particle length of 1.2 μm and an average particle width of 0.04 μm was reduced in a stream of hydrogen at a rate of 3 liters/minute and at 350° C. to give a ferromagnetic powder free of Ni. The powder showed the following magnetic properties as measured at 10 KOe.
Hc = 1,050 Oe
σr = 72.6 emu/g
σs = 165 emu/g
σr/σs = 0.44.

The ferromagnetic powders of this invention contains particles having an iron or doped iron core which is surrounded by a Ni sheath. Of course, a thin Fe—Ni alloy typically forms between the sheath and core.

We claim:

1. A ferromagnetic metallic powder material suitable for use in production of magnetic recording media which comprises iron as a main component and 10–50% by weight of Ni and has a coercive force in the range of 550–900 Oe and a saturation flux density in the range of 90–170 emu/g, wherein said powder comprises particles comprising a core consisting essentially of said iron and a sheath consisting essentially of nickel surrounding said core.

2. A metallic powder material according to claim 1 which has a coercive force of 600–800 Oe.

3. A metallic powder material according to claim 1 which has a saturation flux density of 120–160 emu/g.

4. A process for producing ferromagnetic metallic powders containing 10–50% by weight of Ni and having a coercive force of 550–900 Oe and a saturation flux density of 90–170 emu/g, which comprises the steps of applying an Ni compound in a liquid to a particulate iron compound having an average particle length of 0.5–5μ and an average particle width of 0.02–0.5μ selected from the group consisting of iron oxyhydroxides, iron oxides, iron oxyhydroxide doped with one or more metals other than iron and iron oxides doped with one or more metals other than iron, and then drying and reducing the thus treated material to give a ferromagnetic metallic powder comprising particles having an iron or doped iron core surrounded by a nickel sheath.

5. A process according to claim 4 in which the starting iron compound is selected from the group consisting of α-, β- and γ-FeOOH; α- and γ-$Fe_2O_3$; $Fe_3O_4$; γ-$Fe_2O_3$. $Fe_3O_4$ and these containing 0.5–5% by weight of at least one of Mn, Ni, Ti, Bi, Mo and Ag.

6. A process according to claim 4 in which the Ni compound is a soluble or colloid-forming compound.

7. A process according to claim 6 in which the nickel compound selected from the group consisting of $NiCl_2$, $Ni(NO_3)_2$, $NiSO_4$, $Ni(OH)_xCl_{2-x}$ and $Ni(OH)_x$-$(NO_3)_{2-x}$ (wherein x is from 0 to 2, inclusive).

8. A process according to claim 4 in which the Ni applying step is conducted by suspending the starting iron compound in an aqueous solution of the Ni compound.

9. A process according to claim 8 in which an appropriate neutralizer agent is added to the suspension to partially or completely neutralize the suspension.

10. A process according to claim 4 in which the reduction step is conducted under a reducing atmosphere at a temperature of up to 600° C.

11. A process according to claim 10 which comprises a further step for treating the reduced material with a stream of an air-nitrogen mixture for 4–5 hours while increasing gradually the air content in the mixture up to around 100% at the end of the treatment period.

12. Magnetic recording media prepared from the ferromagnetic powder according to claim 1.

13. A metallic powder material according to claim 2 which has a saturation flux density of 120–160 emu/g.

14. A process according to claim 5, in which the Ni compound is a soluble or colloid-forming compound.

15. A process according to claim 14, in which the nickel compound selected from the group consisting of $NiCl_2$, $Ni(NO_3)_2$, $NiSO_4$, $Ni(OH)_xCl_{2-x}$ and $Ni(OH)_x$-$(NO_3)_{2-x}$ (wherein x is from 0 to 2, inclusive).

16. A process according to claim 5 in which the Ni applying step is conducted by suspending the starting iron compound in an aqueous solution of the Ni compound.

17. A process according to claim 5 in which the reduction step is conducted under a reducing atmosphere at a temperature of up to 600° C.

18. A process according to claim 17 which comprises a further step for treating the reduced material with a stream of an air-nitrogen mixture for 4–5 hours while increasing gradually the air content in the mixture up to around 100% at the end of the treatment period.

19. Magnetic recording media prepared from the ferromagnetic powder according to claim 4.

20. The product of claim 1 wherein said particles of said powder have an iron core with an average length of 0.5–5μ and an average width of 0.02–0.5μ.

21. The product of claim 1 wherein said iron core comprises a dopant.

22. The product of claim 1 wherein said dopant is selected from the group consisting of Mn, Ni, Ti, Bi, Mo and Ag.

* * * * *